United States Patent
Byrnes et al.

(10) Patent No.: US 12,055,931 B2
(45) Date of Patent: Aug. 6, 2024

(54) METHOD AND SYSTEM FOR REMOTE MACHINE CONTROL

(71) Applicant: Danfoss Power Solutions, Inc., Ames, IA (US)

(72) Inventors: Mark D. Byrnes, Minnetonka, MN (US); Rodney L Dockter, Plymouth, MN (US); Chris Woodard, Plymouth, MN (US)

(73) Assignee: DANFOSS POWER SOLUTIONS, INC., Ames, IA (US)

( * ) Notice: Subject to any disclaimer, the term of this patent is extended or adjusted under 35 U.S.C. 154(b) by 525 days.

(21) Appl. No.: 17/298,079

(22) PCT Filed: Nov. 30, 2018

(86) PCT No.: PCT/US2018/063259
§ 371 (c)(1),
(2) Date: May 28, 2021

(87) PCT Pub. No.: WO2020/112134
PCT Pub. Date: Jun. 4, 2020

(65) Prior Publication Data
US 2022/0050455 A1 Feb. 17, 2022

(51) Int. Cl.
*G05D 1/00* (2024.01)
*G05B 19/042* (2006.01)
*G05B 19/045* (2006.01)

(52) U.S. Cl.
CPC ....... *G05D 1/0038* (2013.01); *G05B 19/0426* (2013.01); *G05B 19/045* (2013.01); *G05D 1/0022* (2013.01)

(58) Field of Classification Search
CPC ............... G05D 1/0038; G05D 1/0022; G05D 2201/0202; G05D 2201/0201;
(Continued)

(56) References Cited

U.S. PATENT DOCUMENTS 9,144,907 B2 * 9/2015 Summer ................ B25J 9/1692
10,326,793 B2 * 6/2019 Wesie ................ H04L 63/1416
(Continued)

FOREIGN PATENT DOCUMENTS

| CN | 103310722 A | 9/2013 |
|----|-------------|--------|
| EP | 2 239 876 A2 | 10/2010 |
| JP | 2011028495 A | 2/2011 |

OTHER PUBLICATIONS

Office Action issued for Chinese Patent Application Serial No. 20188099796.7, dated Sep. 26, 2022 and its English translation.
(Continued)

*Primary Examiner* — Anshul Sood
*Assistant Examiner* — Micah Chuen-Him Cheng
(74) *Attorney, Agent, or Firm* — McCormick, Paulding & Huber PLLC

(57) ABSTRACT

A system and method for secure remote control of a machine includes transmitting video data from a camera on the machine to an operator controller located at a remote operation station, and receiving, at a machine controller of the machine, an operator control message from the operator controller. The operator control message is based on an input device actuated in response to the video data. The method further includes confirming validity of the operator control message based, at least in part, on the video data transmitted from the camera to the operator controller, and controlling the machine with the operator control message when validity of the operator control message is confirmed.

17 Claims, 3 Drawing Sheets

(58) Field of Classification Search
CPC ... G05B 19/0426; G05B 19/045; H04L 63/12; H04L 67/12; H04L 1/0061; H04N 7/183
See application file for complete search history.

(56) References Cited

U.S. PATENT DOCUMENTS

| | | | |
|---|---|---|---|
| 11,348,495 B2* | 5/2022 | Tomioka | G02B 27/01 |
| 11,447,928 B2* | 9/2022 | Hatake | H04Q 9/00 |
| 2005/0119801 A1* | 6/2005 | Florentin | G05D 1/0282 |
| | | | 348/148 |
| 2005/0149631 A1 | 7/2005 | Decker | |
| 2006/0069965 A1* | 3/2006 | Ito | H04L 9/0891 |
| | | | 714/100 |
| 2007/0171229 A1 | 7/2007 | Mamiya et al. | |
| 2017/0077950 A1* | 3/2017 | Pavlov | G06F 3/0647 |
| 2017/0177458 A1 | 6/2017 | Viggers et al. | |
| 2018/0137596 A1 | 5/2018 | Chenu | |
| 2019/0181982 A1* | 6/2019 | Hardacker | H04L 12/40045 |
| 2020/0225625 A1* | 7/2020 | Passmore | G05B 19/042 |

OTHER PUBLICATIONS

International Search Report for Application No. PCT/US2018/063259 dated Aug. 16, 2019.

Anonymous: "Sauer-Danfoss Introduces CAN Safety Message for Increased Reliability of CANbus Safety Messages I OEM Off-Highway", Apr. 18, 2013, pp. 1-11, XP093150870, Retrieved from the Internet: URL: https://www.oemoffhighway.com/electronics/press-release/10923682/sauerdanfoss-introduces-can-safety-message-for-increased-reliability-ofcanbus-safety-messages [retrieved on Apr. 11, 2024].

Second Office Action for European Patent Application No. 18,821,859.8, dated Apr. 17, 2024.

* cited by examiner

METHOD AND SYSTEM FOR REMOTE MACHINE CONTROL

CROSS-REFERENCE TO RELATED APPLICATION

This application is a National Stage application of International Patent Application No. PCT/US2018/063259, filed on Nov. 30, 2018, which is hereby incorporated by reference in its entirety.

TECHNICAL FIELD

The present invention relates to remote control of off-highway vehicles.

BACKGROUND

Machines, such as off-highway vehicles, typically include on-board controls for driving, steering, and performing various other functions of the machines. Such machines may include, for example, off-highway vehicles such as wheel loaders, skid steers, tractors, fork lifts, bulldozers, backhoes, cranes, cherry pickers, all-terrain vehicles or the like.

SUMMARY

According to the present disclosure, a secure remote control system for a machine, such as an off-highway vehicle, is disclosed. The machine includes at least one plant, a machine controller configured to control operation of the at least one plant, and a camera positioned on the machine. An operation station is located remote from the machine. The operation station includes at least one input device, a display, and an operator controller operatively connected to the at least one input device and to the display. A wireless connection enables data transfer between the machine controller and the operator controller. The machine controller is configured to transmit video data from the camera to the operator controller over the wireless connection. The operator controller is configured to display the video data on the display and to transmit an operator control messages based on the at least one input device to the machine controller over the wireless connection. The machine controller is configured to confirm validity of the operator control message based, at least in part, on the video data transmitted to the operator controller and to control operation of the at least one plant based on the operator control message when validity of the operator control message is confirmed.

According to the present disclosure, the video data may comprise a compressed image captured by the camera, an image CRC, and an image sequence number. The operator control message may comprise a control signal generated by the input device, a control CRC, and an image sequence number received. The machine controller may confirm validity of the operator control message by checking each of the image CRC, the control CRC, and a comparison of the image sequence number received to the image sequence number for errors.

According to the present disclosure, the machine controller may determine that the control message is valid if the image sequence number received matches the image sequence number transmitted and may determine that the control message is invalid if the image sequence number received does not match the image sequence number transmitted. The machine controller may shutdown operation of the machine when the validity of the operator control message is not confirmed.

According to the present disclosure, a method for secure remote control of a machine is disclosed. The method comprises transmitting video data from a camera on the machine to an operator controller located at a remote operation station, and receiving, at a machine controller of the machine, an operator control message from the operator controller, the operator control message based on an input device actuated in response to the video data. The method further comprises confirming validity of the operator control message based, at least in part, on the video data transmitted from the camera to the operator controller, and controlling the machine with the operator control message when validity of the operator control message is confirmed.

According to the present disclosure, the method may further comprise displaying the video data on a display of the operation station by the operator controller.

According to the present disclosure, the method may further comprise shutting down operation of the machine when the validity of the operator control message is not confirmed.

According to the present disclosure, confirming validity of the operator control message based, at least in part, on the video data transmitted from the camera to the operator controller may comprise comparing an image sequence number included in the video data transmitted to an image sequence number received included in the operator control message received from the operator controller. The machine controller may determine that the control message is valid if the image sequence number received matches the image sequence number transmitted and may determine that the control message is invalid if the image sequence number received does not match the image sequence number transmitted.

According to the present disclosure, the method may further comprise confirming validity of the video data at the operator controller. The method may also comprise shutting down operation of the machine when the validity of the video data is not confirmed.

According to the present disclosure, the video data may comprise a compressed image captured by the camera, an image CRC, and an image sequence number. The operator control message may comprise a control signal generated by the input device, a control CRC, and an image sequence number received. Confirming validity of the operator control message based, at least in part, on the video data transmitted from the camera to the operator controller may include checking each of the image CRC, the control CRC, and a comparison of the image sequence number received to the image sequence number for errors.

According to the present disclosure, transmitting video data from the camera on the machine to the operator controller may include sequentially transmitting a plurality of video data messages. Receiving, at the machine controller of the machine, the operator control message from the operator controller may include sequentially receiving a plurality of operator control messages, each operator control message of the plurality being based on the input device. Confirming validity of the operator control message based, at least in part, on the video data transmitted from the camera to the operator controller may include confirming the validity of each operator control message of the plurality of operator control messages based, at least in part, on a corresponding video data message of the plurality of video data messages transmitted from the camera to the operator controller. Controlling the machine with the operator control message when validity of the operator control message is confirmed may include controlling the machine with each valid operator control message of the plurality of operator control messages.

According to the present disclosure, a method for secure remote control of a machine is disclosed. The method comprises transmitting video data from a camera on the machine to a remote operation station, displaying the video data on a display of the operation station, and transmitting an operator control message from an operator controller of the operation station to the machine based on at least one input device of the operation station. The method further comprises confirming validity of the operator control message based, at least in part, on the video data transmitted from the camera to the operation station, and controlling the machine with the operator control message when validity of the operator control message is confirmed.

According to the present disclosure, the method may further comprise shutting down operation of the machine when the validity of the operator control message is not confirmed.

According to the present disclosure, confirming validity of the operator control message based, at least in part, on the video data transmitted from the camera to the operator controller may comprise comparing an image sequence number included in the video data to an image sequence number received included in the operator control message. The machine controller may determine that the control message is valid if the image sequence number received matches the image sequence number transmitted, and may determine that the control message is invalid if the image sequence number received does not match the image sequence number transmitted.

According to the present disclosure, the method may further comprise confirming validity of the video data at the operation station by the operator controller before displaying the video data on the display. The method may further comprise shutting down operation of the machine when the validity of the video data is not confirmed.

According to the present disclosure, the video data may comprise a compressed image captured by the camera, an image CRC, and an image sequence number. The operator control message may comprise a control signal generated by the input device, a control CRC, and an image sequence number received. Confirming validity of the operator control message based, at least in part, on the video data transmitted from the camera to the operation station may include checking each of the image CRC, the control CRC, and a comparison of the image sequence number received to the image sequence number for errors.

These and other objects, features and advantages of the present disclosure will become apparent in light of the detailed description of embodiments thereof, as illustrated in the accompanying drawings.

DETAILED DESCRIPTION

Before the various controllers, systems, and methods of the present disclosure are described in further detail, it is to be understood that the invention is not limited to the particular embodiments described. It will be understood by one of ordinary skill in the art that the controllers, systems, and methods described herein may be adapted and modified as is appropriate for the application being addressed and that the controllers, systems, and methods described herein may be employed in other suitable applications, and that such other additions and modifications will not depart from the scope thereof.

Figure 1:
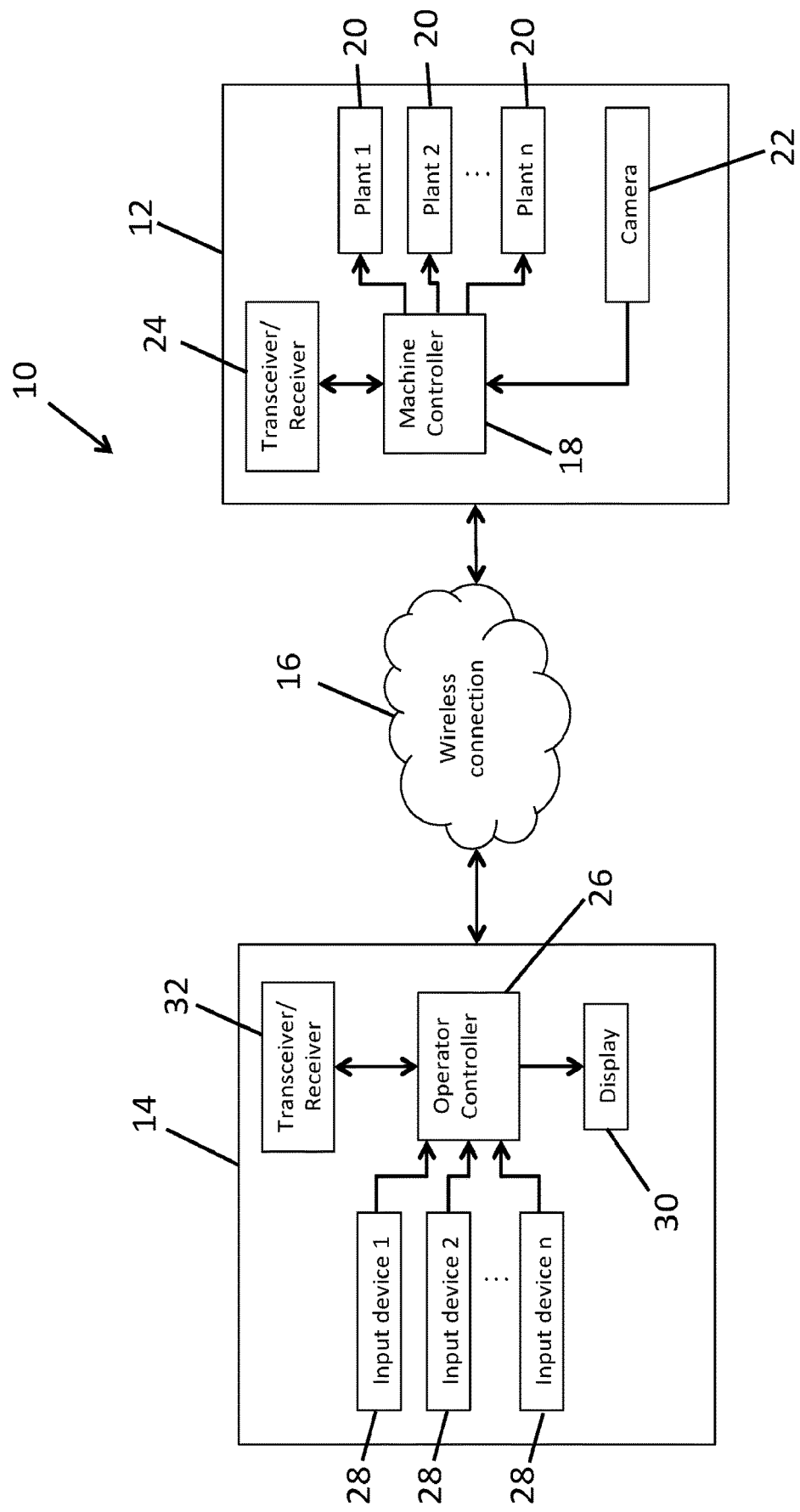
FIG. 1 is a schematic diagram of a system for remote machine control according to the present disclosure.

Referring to FIG. 1, a remote machine control system 10 according to the present disclosure includes a machine 12 and an operation station 14 located remote from the machine 12. The machine 12 and operation station 14 are operatively connected with one another over a wireless connection 16, which may be, for example, a local area network, a wide area network, a Bluetooth connection, or any other similar wireless connection.

The machine 12 may be any off-highway vehicle such as a wheel loader, skid steer, tractor, fork lift, bulldozer, backhoe, crane, cherry picker, all-terrain vehicle or the like. The machine 12 includes a machine controller 18, at least one plant 20, a camera 22, and a transceiver/receiver 24. The at least one plant 20, camera 22, and transceiver/receiver 24 are all operatively connected to the machine controller 18 and configured to send thereto and/or receive therefrom signals, commands and/or other information. For example, the machine controller 18, at least one plant 20, camera 22, and transceiver/receiver 24, as well as other various subsystems of the machine 12, may be connected to one another over a Controller Area Network (CAN or CAN bus) or other similar network that allows the machine controller 18, at least one plant 20, camera 22, transceiver/receiver 24, and various other subsystems, microprocessors, and/or any other devices connected to the CAN or other similar network to communicate with one another using CAN or other communication protocols known in the art.

The at least one plant 20 may include mechanical, electrical, and/or hydraulic systems, such as motors, pumps, switches, and/or other similar hydraulic, mechanical, and/or electrical elements that propel, steer, and/or run other functions of the machine 12. Operation of the at least one plant 20 is controlled by the machine controller 18. The camera 22 is positioned on the machine 12 to capture video substantially similar or identical to the view an operator of the machine 12 would have from an operator's cab of the machine 12. The camera 22 may have a fixed view or, alternatively, the camera 22 may be able to move or alter its view in response to commands received from the machine controller 18. For example, the camera 22 may rotate/turn, zoom in or out, or perform other similar movements in response to command signals from the machine controller 18. The camera 22 is configured to capture video and to provide the captured video to the machine controller 18. The transceiver/receiver 24 allows the machine controller 18 to send data to and receive data from the operation station 14 over the wireless connection 16.

The operation station 14 is located remote from the machine 12. For example, the machine 12 may be located at a jobsite while the operation station 14 may be located at a control center having a different location than the jobsite. Alternatively, the operation station 14 may be located at the jobsite but positioned at a different, discrete location on the jobsite than the machine 12. The operation station 14 includes an operator controller 26, at least one input device 28, a display 30, and a transceiver/receiver 32. The at least one input device 28, display 30, and transceiver/receiver 32 are all operatively connected to the operator controller 26 and configured to send thereto and/or receive therefrom signals, commands and/or other information. The at least one input device 28 may include one or more joysticks, pedals, steering wheels, buttons, dials, knobs, and/or any other similar control devices. The at least one input device 28 provides one or more control input signals to the operator controller 26.

The display 30 includes a screen or other similar video display device and is configured to receive video data from the operator controller 26 and to display the video data for an operator. The transceiver/receiver 32 allows the operator controller 26 to send data to and receive data from the machine 12 over the wireless connection 16.

The machine controller 18 and operator controller 26 include all of the necessary electronics, software, memory, storage, databases, firmware, logic/state machines, microprocessors, communication links, and any other input/output interfaces to perform the functions described herein and/or to achieve the results described herein. For example, the machine controller 18 and operator controller 26 may include, or be in communication with, one or more processors and memory, which may include system memory, including random access memory (RAM) and read-only memory (ROM). Suitable computer program code may be provided to the machine controller 18 and operator controller 26 for executing numerous functions, including those discussed herein in connection with providing secure data transfer between the machine 12 and operation station 14 and with providing for secure, reliable remote control of the machine 12 by an operator at the operation station 14.

The one or more processors may include one or more conventional microprocessors and may also include one or more supplementary co-processors such as math co-processors or the like. The one or more processors may be configured to communicate with other networks, such as the wireless connection 16 through transceiver/receiver 24 and/or transceiver/receiver 32, and/or with other devices, such as servers, other processors, computers, smartphones, tablets and/or the like.

The one or more processors may be in communication with the memory, which may comprise magnetic, optical and/or semiconductor memory, such as, for example, random access memory ("RAM"), read only memory ("ROM"), flash memory, optical memory, or a hard disk drive memory. Memory may store any data and/or information typically found in computing devices, including an operating system, and/or one or more other programs (e.g., computer program code and/or a computer program product) that are stored in a non-transitory memory portion and adapted to direct the machine 12, including the machine controller 18, the operation station 14, including the operator controller 26, and/or the system 10 to perform according to the various embodiments discussed herein. Control logic and/or operating systems of the machine controller 18 and operator controller 26 and/or portions thereof, and/or any other programs may be stored, for example, in a compressed format, an uncompiled and/or an encrypted format, and may include computer program code executable by the one or more processors. The executable instructions of the computer program code may be read into a main memory of the one or more processors from a non-transitory computer-readable medium other than the memory. While execution of sequences of instructions in the program causes the one or more processors to perform the process steps described herein, hard-wired circuitry may be used in place of, or in combination with, executable software instructions for implementation of the processes of the present invention. Thus, embodiments of the present invention are not limited to any specific combination of hardware and software.

For example, the methods and systems discussed herein and portions thereof may also be implemented in programmable hardware devices such as field programmable gate arrays, programmable array logic, programmable logic devices or the like. Programs may also be implemented in software for execution by various types of computer processors. A program of executable code may, for instance, comprise one or more physical or logical blocks of computer instructions, which may, for instance, be organized as an object, procedure, process or function. Nevertheless, the executables of an identified program need not be physically located together, but may comprise separate instructions stored in different locations which, when joined logically together, comprise the program and achieve the stated purpose for the programs such as providing secure data transfer between the machine 12 and operation station 14 and providing for secure, reliable remote control of the machine 12 by an operator at the operation station 14. In an embodiment, an application of executable code may be a compilation of many instructions, which may be distributed over several different code partitions or segments, among different programs, and across several devices.

The term "computer-readable medium" as used herein refers to any medium that provides or participates in providing instructions and/or data to the one or more processors of the system 10 (or any other processor of a device described herein) for execution. Such a medium may take many forms, including but not limited to, non-volatile media or memory and volatile memory. Non-volatile memory may include, for example, optical, magnetic, or opto-magnetic disks, or other non-transitory memory. Volatile memory may include dynamic random access memory (DRAM), which typically constitutes the main memory or other transitory memory.

Figure 2:
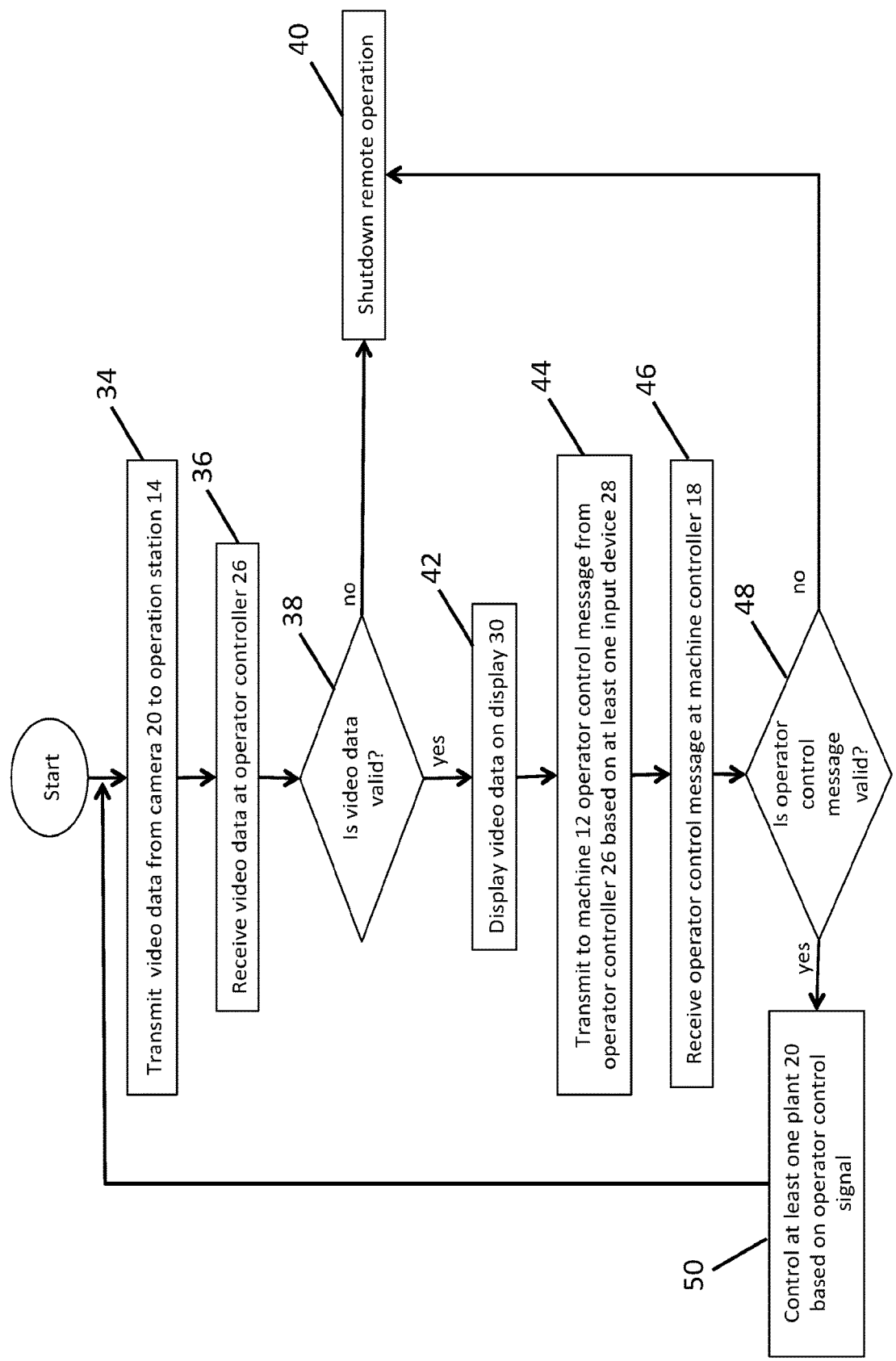
FIG. 2 is a flowchart showing a method for providing secure remote machine control in the system of FIG. 1.

Referring to FIG. 2, a method for secure remote control of machine 12 by operation station 14 in the system 10 according to the present disclosure is shown. In operation, the machine controller 18 begins by transmitting video data from the camera 20 to the operation station 14 at 34. The video data is transmitted to the operation station 14 through the transceiver/receiver 24 over the wireless connection 16. The video data includes a compressed image captured by the camera 20, an image CRC (cyclic redundancy check), and an image sequence number and may be transmitted using the PLUS-+1 CAN Safety Message protocol developed by Sauer-Danfoss. In this protocol, the video data is sent as a safety data group that includes a pair of CAN messages, namely, a safety data message and a safety header message. The safety header message is used to validate the safety data message and is send after the safety data message within a minimum delay. The safety data message is a standard data message containing the compressed image captured by the camera 20. The safety header message is used to ensure that there are no errors in the standard message and contains the image sequence number, the image CRC, and an identifier of the standard safety data message with which the safety header message is associated.

At 36, the operator controller 26 of the operation station 14 receives the video data through transceiver/receiver 34. At 38, the operator controller 26 determines whether or not the video data received from the machine controller 18 is valid. The video data is valid only if both CAN messages of the safety data group, i.e. the safety data message and the safety header message, are received properly without failure and within time. In order to test for timely delivery of the safety data group, the operator controller 26 compares a time difference between receipt of the safety data message and the safety header message to a preset safety-relevant validation time. If the time between receipt of the safety data message and the safety header message is greater than the safety-relevant validation time, the operator controller 26 determines that the video data is invalid. The safety-relevant validation time is a preset value that may be stored in memory accessible by the operator controller 26. In order to test for timely delivery of the safety data group, the operator controller 26 also compares a time difference between receipt of successive safety data group pairs to a preset safeguard cycle time. If the time between receipt of successive safety data group pairs is greater than the safeguard cycle time, the operator controller 26 determines that the video data is invalid. The safeguard cycle time is also a preset value that may be stored in memory accessible by the operator controller 26. The operator controller 26 uses the image CRC in the safety header message to perform a cyclic redundancy check on the safety data message to ensure that there are no changes in the data included in the safety data message, i.e. the compressed image. If there are changes in the data, the operator controller 26 determines that the video data is invalid.

If the operator controller 26 determines that the video data is invalid for any of the reasons discussed above, the system 10 proceeds to shutdown remote operation of the machine 12 at 40 by controlling the machine 12 to enter a safe state. The safe state may be, for example, a state in which the machine 12 becomes immobile. Thus, the operator controller 26 ensures receipt of timely and valid video from the camera 20 before using the video at the operation station 14.

If the operator controller 26 determines that the video data is valid at 38, the operator controller 26 then displays the image from the safety data message on the display 30 at 42. While viewing the image on the display 30, an operator at the operation station 14 uses the at least one input device 28 to generate control signals for controlling operation of the machine 12 based on the image displayed. The control signals may be, for example, for propelling the machine 12, for steering the machine 12, for moving a boom or bucket of the machine 12, and/or for controlling any other similar function of the machine 12.

At 44, the operator controller 26 transmits a control message that includes the control signals generated by the at least one input device 28 to the machine 12. The control message may also be transmitted using the PLUS-+1 CAN Safety Message protocol developed by Sauer-Danfoss and is transmitted to the machine controller 18 through the transceiver/receiver 32 over the wireless connection 16. The control message includes the image sequence number received with the video data, the control signal generated by the at least one input device 28, and a control CRC. Like the video data, the control message is also sent as a safety data group that includes a pair of CAN messages, namely, a safety data message and a safety header message. The safety header message is used to validate the safety data message and is send after the safety data message within a minimum delay. The safety data message is a standard data message containing the control signal generated by the at least one input device 28. The safety header message is used to ensure that there are no errors in the standard message and contains the image sequence number received with the video data, the control CRC, and an identifier of the standard safety data message with which the safety header message is associated.

At 46, the machine controller 18 of the machine 12 receives the control message through transceiver/receiver 24. At 48, the machine controller 18 determines whether or not the control message received from the operator controller 26 is valid. As with the video data, the control message is valid only if both CAN messages of the safety data group, i.e. the safety data message and the safety header message, are received properly without failure and within time. In order to test for timely delivery of the safety data group, the machine controller 18 compares a time difference between receipt of the safety data message and the safety header message to a preset safety-relevant validation time. If the time between receipt of the safety data message and the safety header message is greater than the safety-relevant validation time, the machine controller 18 determines that the control message is invalid. The safety-relevant validation time is a preset value that may be stored in memory accessible by the machine controller 18. In order to test for timely delivery of the safety data group, the machine controller 18 also compares a time difference between receipt of successive safety data group pairs to a preset safeguard cycle time. If the time between receipt of successive safety data group pairs is greater than the safeguard cycle time, the machine controller 18 determines that the control message is invalid. The safeguard cycle time is also a preset value that may be stored in memory accessible by the machine controller 18. The machine controller 18 uses the control CRC in the safety header message to perform a cyclic redundancy check on the safety data message to ensure that there are no changes in the data included in the safety data message, i.e. the control signal. If there are changes in the data, the machine controller 18 determines that the control message is invalid.

Additionally, the machine controller 18 compares the image sequence number received from the safety header message of the control message with the image sequence number initially transmitted in the video data to ensure that the control signals received in the control message are consistent with and/or responsive to the video data sent by the machine controller 18 from the camera 20.

If the machine controller 18 determines that the control message is invalid for any of the reasons discussed above, the system 10 proceeds to shutdown remote operation of the machine 12 at 40 by controlling the machine 12 to enter a safe state. The safe state may be, for example, a state in which the machine 12 becomes immobile. Thus, the machine controller 18 ensures receipt of timely and valid control signals from the at least one input device 28 before using the control signals to operate the machine 12.

If the machine controller 18 determines that the control message is valid at 48, the machine controller 18 then passes the control signals from the remote operator on to the at least one plant 20 to control operation thereof at 50. The control signals may, for example, propel the machine 12, steer the machine 12, move a boom or bucket of the machine 12, and/or control any other similar function of the machine 12.

Figure 3:
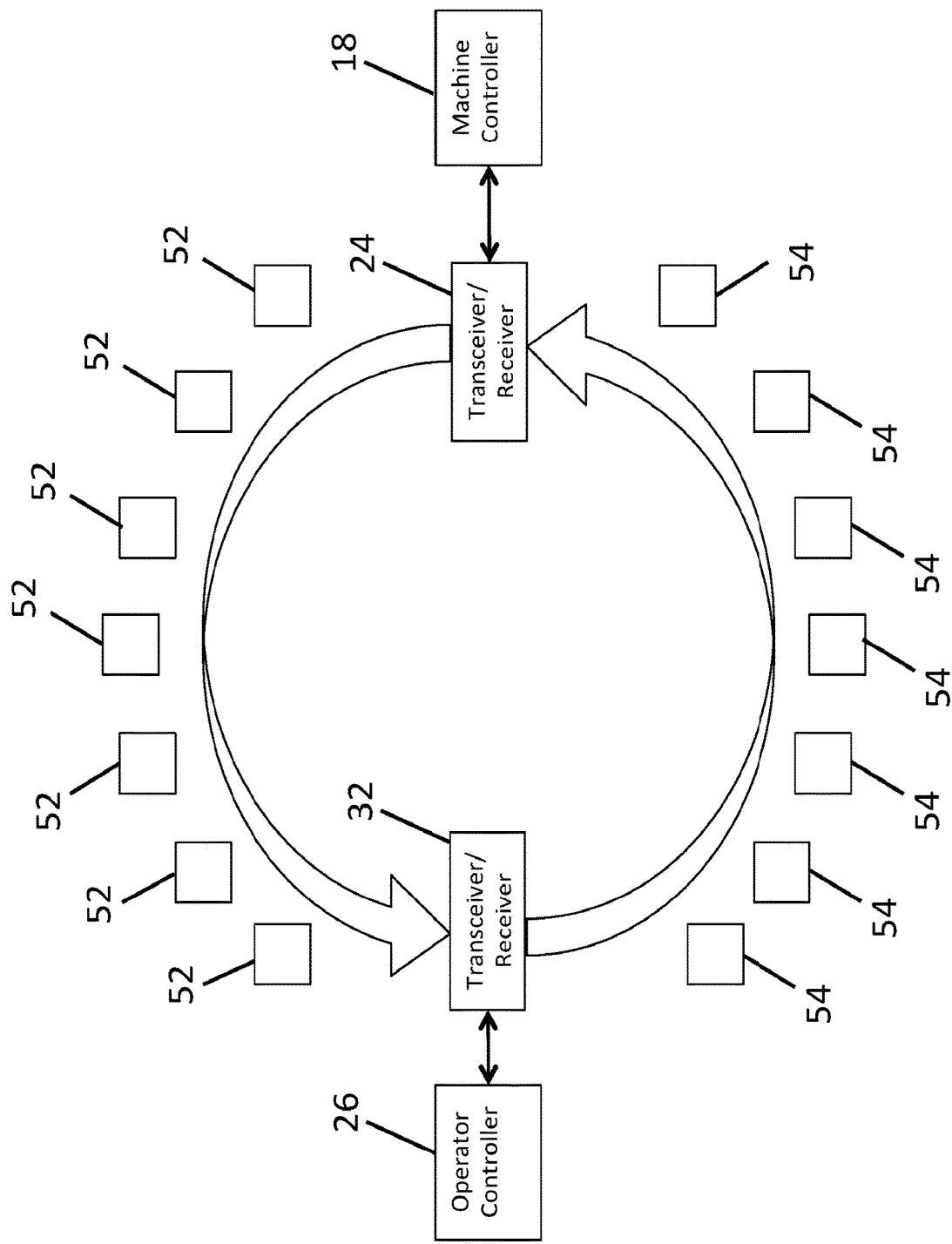
FIG. 3 is a schematic diagram showing data exchange in the system of FIG. 1.

For simplicity, FIG. 2 has been described in connection with the transmission and receipt of a single video data message and one corresponding control message. However, it should be understood from the present disclosure that during operation of the system 10, video data messages and control messages will be exchanged as continuous sequences between the machine controller 18 and operator controller 26 (with an untimely interruption of either sequence resulting in the determination of an invalid message at decision block 38 or decision block 48). For example, referring to FIG. 3, a plurality of video data messages 52 are transmitted from the machine controller 18 through transceiver/receiver 24. Each video data message 52 includes a compressed image captured by the camera 20, an image CRC, and an image sequence number transmitted as a safety data group that includes a safety data message and a safety header message in the manner discussed above in connection with FIG. 2. These video data messages 52 are received by the operator controller 26 through the transceiver/receiver 32 and used in the same manner described in connection with FIG. 2. Likewise, a plurality of control messages 54 are transmitted from the operator controller 26 through transceiver/receiver 32. Each control message 54 includes a control signal, a control CRC, and an image sequence number of the image received and is transmitted as a safety data group that includes a safety data message and a safety header message in the manner discussed above in connection with FIG. 2. These control messages 54 are received by the machine controller 18 through the transceiver/receiver 24 and used in the same manner described in connection with FIG. 2.

The system and method of the present disclosure advantageously provides for remote control and monitoring of machines such as off-highway vehicles by allowing a remote user to receive live, real-time, reliable, and secure video information from a vehicle for the purpose of remote operation and/or inspection. In particular, the system and method advantageously ensures: timely and valid video from the machine 12 is provided to the operation station 14, timely and valid control from the operation station 14 is provided to the machine 12, safety control signals are provided to the machine 12 in case of communication channel failure, and a two-way data integrity verification checks for image corruption. Thus, the present disclosure ensures reliability for control of off-highway machinery by providing a method of verifying video and control messages while taking into consideration the time dependent nature of safety-critical controls.

The present disclosure advantageously an improved method for verifying reliable remote communication and/or control of safety critical systems for off-highway vehicles, thereby allowing a remote machine operator to control a machine without directly observing the machine. The system of the present disclosure verifies that the video that is shown to the remote operator on the display is identical to what the operator would see if they were in the operator's cab on the machine. Additionally, the system advantageously ensures that video feed from the camera is current and that the images have not been tampered with.

While various embodiments have been described in the present disclosure, it will be appreciated by those of ordinary skill in the art that modifications can be made to the various embodiments without departing from the spirit and scope of the invention as a whole. Accordingly, the particular embodiments described in this specification are to be taken as merely illustrative and not limiting.

What is claimed is:

1. A secure remote control system comprising:
   a machine including at least one plant, a machine controller configured to control operation of the at least one plant, and a camera;
   an operation station located remote from the machine, the operation station comprising at least one input device, a display, and an operator controller operatively connected to the at least one input device and to the display; and
   a wireless connection enabling data transfer between the machine controller and the operator controller;
   wherein the machine controller is configured to transmit video data from the camera to the operator controller over the wireless connection;
   wherein the operator controller is configured to display the video data on the display and to transmit an operator control message based on the at least one input device to the machine controller over the wireless connection;
   wherein the machine controller is configured to confirm validity of the operator control message based, at least in part, on the video data transmitted to the operator controller and to control operation of the at least one plant based on the operator control message when validity of the operator control message is confirmed,
   wherein the video data comprises a compressed image captured by the camera, an image CRC, and an image sequence number;
   wherein the operator control message comprises a control signal generated by the input device, a control CRC, and an image sequence number received; and
   wherein the machine controller is configured to confirm validity of the operator control message by checking each of the image CRC, the control CRC, and a comparison of the image sequence number received to the image sequence number for errors.

2. The system according to claim 1, wherein the machine controller determines that the operator control message is valid if the image sequence number received matches the image sequence number transmitted; and
   wherein the machine controller determines that the operator control message is invalid if the image sequence number received does not match the image sequence number transmitted.

3. The system according to claim 2, wherein the machine controller shuts down operation of the machine when the validity of the operator control message is not confirmed.

4. A method for secure remote control of a machine, the method comprising:
   transmitting video data from a camera on the machine to an operator controller located at a remote operation station;
   receiving, at a machine controller of the machine, an operator control message from the operator controller, the operator control message based on an input device actuated in response to the video data;
   confirming validity of the operator control message based, at least in part, on the video data transmitted from the camera to the operator controller;
   controlling the machine with the operator control message when validity of the operator control message is confirmed; and
   shutting down operation of the machine when the validity of the operator control message is not confirmed.

5. The method according to claim 4, further comprising displaying the video data on a display of the remote operation station by the operator controller.

6. The method according to claim 4, wherein confirming validity of the operator control message based, at least in part, on the video data transmitted from the camera to the operator controller comprises:
   comparing an image sequence number included in the video data transmitted to an image sequence number received included in the operator control message received from the operator controller.

7. The method according to claim 6, wherein the machine controller determines that the operator control message is valid if the image sequence number received matches the image sequence number transmitted; and wherein the machine controller determines that the operator control message is invalid if the image sequence number received does not match the image sequence number transmitted.

8. The method according to claim 4, further comprising confirming validity of the video data at the operator controller.

9. The method according to claim 8, further comprising shutting down operation of the machine when the validity of the video data is not confirmed.

10. The method according to claim 4, wherein the video data comprises a compressed image captured by the camera, an image CRC, and an image sequence number;
wherein the operator control message comprises a control signal generated by the input device, a control CRC, and an image sequence number received; and
wherein confirming validity of the operator control message based, at least in part, on the video data transmitted from the camera to the operator controller includes checking each of the image CRC, the control CRC, and a comparison of the image sequence number received to the image sequence number for errors.

11. The method according to claim 4, wherein transmitting video data from the camera on the machine to the operator controller includes sequentially transmitting a plurality of video data messages;
wherein receiving, at the machine controller of the machine, the operator control message from the operator controller includes sequentially receiving a plurality of operator control messages, each operator control message of the plurality being based on the input device;
wherein confirming validity of the operator control message based, at least in part, on the video data transmitted from the camera to the operator controller includes confirming the validity of each operator control message of the plurality of operator control messages based, at least in part, on a corresponding video data message of the plurality of video data messages transmitted from the camera to the operator controller; and
wherein controlling the machine with the operator control message when validity of the operator control message is confirmed includes controlling the machine with each valid operator control message of the plurality of operator control messages.

12. A method for secure remote control of a machine, the method comprising:
transmitting video data from a camera on the machine to a remote operation station;
displaying the video data on a display of the remote operation station;
transmitting an operator control message from an operator controller of the remote operation station to the machine based on at least one input device of the remote operation station;
confirming validity of the operator control message based, at least in part, on the video data transmitted from the camera to the remote operation station;
controlling the machine with the operator control message when validity of the operator control message is confirmed; and
shutting down operation of the machine when the validity of the operator control message is not confirmed.

13. The method according to claim 12, wherein confirming validity of the operator control message based, at least in part, on the video data transmitted from the camera to the operator controller comprises:
comparing an image sequence number included in the video data to an image sequence number received included in the operator control message.

14. The method according to claim 13, wherein a machine controller of the machine determines that the operator control message is valid if the image sequence number received matches the image sequence number transmitted; and
wherein the machine controller determines that the operator control message is invalid if the image sequence number received does not match the image sequence number transmitted.

15. The method according to claim 12, further comprising confirming validity of the video data at the remote operation station by the operator controller before displaying the video data on the display.

16. The method according to claim 15, further comprising shutting down operation of the machine when the validity of the video data is not confirmed.

17. The method according to claim 12, wherein the video data comprises a compressed image captured by the camera, an image CRC, and an image sequence number;
wherein the operator control message comprises a control signal generated by the input device, a control CRC, and an image sequence number received; and
wherein confirming validity of the operator control message based, at least in part, on the video data transmitted from the camera to the remote operation station includes checking each of the image CRC, the control CRC, and a comparison of the image sequence number received to the image sequence number for errors.

* * * * *